March 8, 1966 C. A. SCHWARTZ 3,239,784
COIL STRUCTURE FOR A WELDING TRANSFORMER
Original Filed Jan. 23, 1961 5 Sheets-Sheet 1

Inventor
CHARLES A. SCHWARTZ

By Diller & Ornstein
Attorneys

Inventor
CHARLES A. SCHWARTZ
By
Attorneys

March 8, 1966 C. A. SCHWARTZ 3,239,784
COIL STRUCTURE FOR A WELDING TRANSFORMER
Original Filed Jan. 23, 1961 5 Sheets-Sheet 3

Inventor
CHARLES A. SCHWARTZ
By Isler & Ornstein
Attorneys

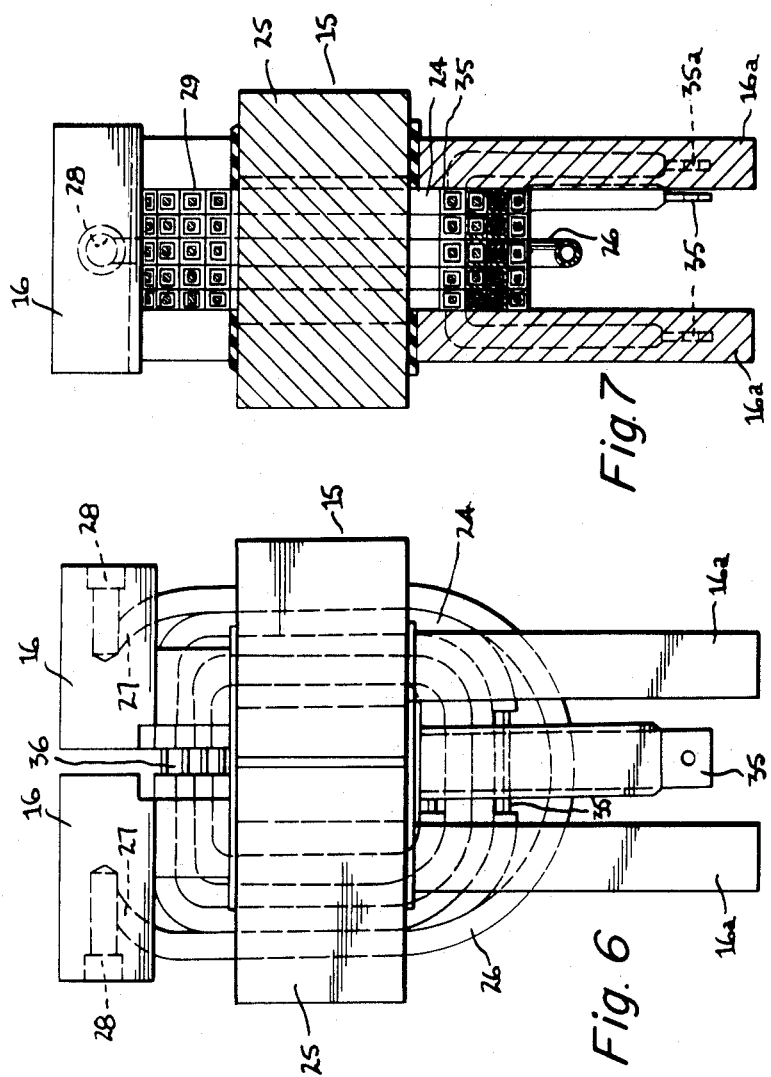

March 8, 1966  C. A. SCHWARTZ  3,239,784

COIL STRUCTURE FOR A WELDING TRANSFORMER

Original Filed Jan. 23, 1961  5 Sheets-Sheet 5

Inventor
CHARLES A. SCHWARTZ

By *Tiler & Ornstein*
Attorneys

United States Patent Office 3,239,784
Patented Mar. 8, 1966

3,239,784
COIL STRUCTURE FOR A WELDING TRANSFORMER
Charles Aaron Schwartz, 3637 Sutherland Road, Shaker Heights, Ohio
Original application Jan. 23, 1961, Ser. No. 84,197. Divided and this application Apr. 4, 1962, Ser. No. 185,035
3 Claims. (Cl. 336—195)

This application is a division of application Serial No. 84,197 filed January 23, 1961, and now abandoned, by Charles A. Schwartz for Resistance Welding Apparatus and Method of Controlling Same.

The present invention relates generally to electro-mechanical apparatus for the production of weldments and more particularly to apparatus for the resistance welding of such articles in manufacturing operations, especially where the production of each article requires a plurality of welds or involves heavy (high current value) welding or where the mass or weight of the physical apparatus is a critical factor, such as in hand guns, where light weight is necessary to permit manual manipulation.

One of the problems encountered in the art is that the welding transformers required for resistance welding are so designed that they must be of relatively large physical size for the energy values required for the welding operation. This size factor makes it impracticable to integrate the transformer with the welding electrodes at the weld-point. Instead, the transformer is located at a point remote from the electrodes and is electrically connected to the electrodes by means of power leads. The necessary use of such power leads, in turn, results in energy losses between the transformer and the welding electrodes which requires that the transformer output (and correspondingly the transformer bulk) be greater to compensate for such energy loss and still provide adequate power at the electrodes.

The physical size and electrical capacity of the welding transformer becomes a critical factor in the design of welding apparatus for simultaneously performing a multiplicity of welds. The energy values required for such multiple resistance welding and the space problems involved in dealing with very large transformers and power conductors create practical mechanical and electrical problems which limit the character and quantity of the simultaneous resistance welds for which such apparatus is used. Instead, a weldment which requires a large number of resistance welds is generally processed in successive welding stages; either by manual handling between two or more units of welding apparatus or by mechanical transfer to different stations on a multiple stage welding unit. In that way, the total weld is progressively accomplished at significant cost or in duplicate power equipment, handling expense and transfer equipment which could be avoided or minimized if the total weld could be accomplished simultaneously.

It is the primary object of my invention to provide a resistance welding apparatus which will make practicable the simultaneous welding of a larger number of welds on production articles, by obviating the power and space factors which have heretofore limited such production welding.

Another object of my invention, is to provide a novel form of control arrangement for welding apparatus which requires momentarily large electrical power values on an intermittent basis.

A further object of my invention is to provide a compact form of welding transformer for use in such apparatus and an economical method of making the same.

Other objects and advantages of my invention will be apparent during the course of the following description.

In the accompanying drawings forming a part of this specification and in which like numerals are employed to designate like parts throughout the same, FIG. 1 is a plan view of a wire-formed production article which is representative of the type of article which ordinarily has a large number of weldpoints.

FIG. 6 is a cross-sectional view taken on line 6—6 of FIG. 5.

FIG. 7 is another cross-sectional view taken on line 7—7 of FIG. 5.

*The welding apparatus*

Figure 1:
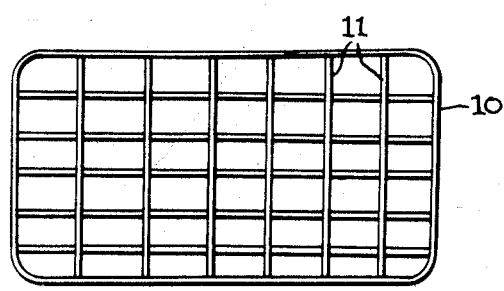

Referring more particularly to the drawings, in FIG. 1 I have shown in somewhat simplified form a cross-wire assembly for an article 10. The article 10 is conventionally fabricated from aplurality of individual wire or rod elements 11 which are welded to each other at their several points of intersection or juncture, which are hereinafter referred to as weldpoints. Such an article may have in excess of 80 weldpoints, for example.

Figure 2:
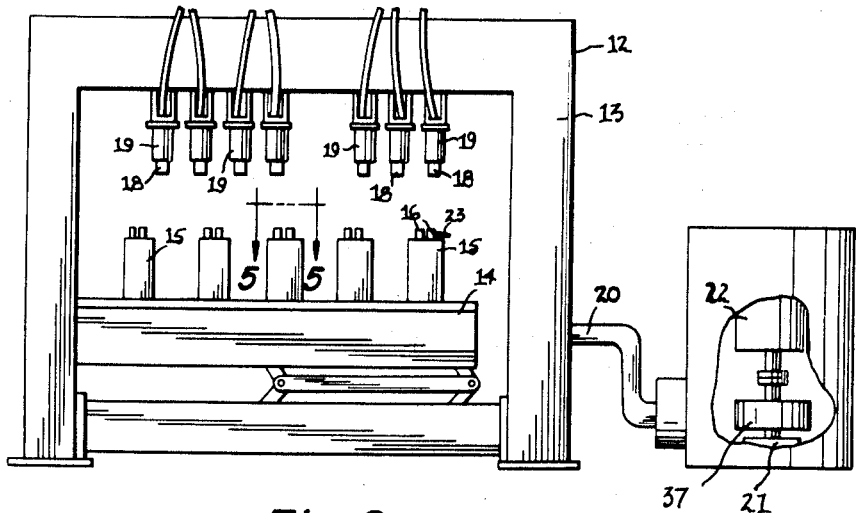
FIG. 2 is a front elevation of a welding apparatus for the simultaneous welding of the article of FIG. 1.

As illustrated in FIG. 2, a production apparatus 12 is provided for the resistance welding of the article 10. The apparatus 12 is a welding press of generally conventional form having an upright rectangular frame 13 on which is mounted a vertically-movable support bed or platen 14. In conventional practice, the bed 14 usually only carries the welding fixtures upon which the elements 11 of article 10 are supported during the welding assembly. However, in my form of welding apparatus, the bed 14 has a plurality of welding transformers 15 mounted thereon, the integrated electrodes 16 of which are fashioned to receive the elements 11 in the desired relationship. The individual transformers 15 may be suitably semi-encased by insulating panels or blocks 17 and mounted at appropriate positions of elevation above the bed 14, or may be otherwise secured in any suitable manner to provide a support for the article 10.

Mounted in depending relationship from the upper portion of the frame 13 are a plurality of shorting bars 18 which are severally mounted upon short stroke hydraulic or pneumatic cylinders 19 which are adapted to maintain the shorting bars in electro-conductive clamping relationship to the article 10 and the electrodes 16, with sufficient welding force for a satisfactory weld. The several shorting bars 18 are so located as to be complementary to the several sets of welding electrodes 16 presented by the transformers 15 so as to complete a welding circuit through each of the weldpoints when the support bed 14 is raised into operative position.

The above described arrangement represents a form of series welding in which a weld is created between the shorting bar and each of the electrode poles. However, it will be evident that the invention is not limited to this particular arrangement, but also contemplates push-pull welding, utilizing two sets of transformer-powered electrodes arranged for confrontation with electrodes of unlike polarity and, also, direct welding in which the weld is made at only one pole of the electrode, with the shorting bar directly completing the circuit to the other electrode pole. Likewise, the transformer-mounted electrodes can be fixed, as indicated, or the transformer assembly can be mounted for movement, as desired.

The transformers 15 are supplied through cables 20 with electrical energy from an alternator 21 which is preferably located closely adjacent to the welding press 12. As here illustrated, the alternator is driven by an electric motor 22. The pertinent details of the alternator will be more fully described hereinafter.

In many instances, it is desirable that the transformers 15, or at least some of them, be artificially cooled, to accelerate the heat dissipation which otherwise would only be to atmosphere at ambient temperature. For this purpose, I have shown water hoses or conduits 23 for circulating cooling water through the transformer assembly, where necessary.

The welding transformers

Figure 5:
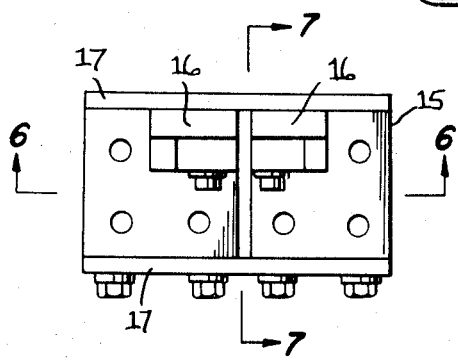
FIG. 5 is a plan view of one of the transformer assemblies taken as indicated on line 5—5 of FIG. 2.

Referring more particularly to FIGS. 5–7 of the drawings, the transformer 15 comprises the primary and secondary coil assembly 24 which traverses a banded iron core 25 which is insulated therefrom. If water cooling is desired, a water conduit 26, preferably of flat form having large surface area for intimate heat transfer contact with the transformer coil assembly 24, may be secured to the coil assembly 24. The ends 27 of the conduit 26 may be tubular and connected to the openings or passageways 28 which are suitably provided in the welding electrodes 16, as indicated, and which, my the hoses 23, are connected to a source of cooling water which circulates through the conduit 26 to aid in dissipating the operating heat which may be created in the transformer coil.

The coil assembly 24 is made of a novel form of coaxial conductor 29 which consists of a central conductor wire 30 extending axially within an outer conductor 31 of square cross section. High-temperature mineral insulating material 32 in powdered or granular form is packed around the wire 30 within the casing provided by the outer conductor 31 to maintain the wire 30 in insulated spaced relationship to the outer conductor 31. As will appear more fully hereinafter, the central conductor wire 30 forms the primary coil of the transformer, and the outer conductor 31 is a single-turn secondary coil of the transformer.

The coil assembly 24 may, for certain applications, consist of a single pancake coil 33 having several coplanar turns in a plurality of layers, but I have chosen to illustrate a coil assembly which has a plurality of five such pancake coils 33, to provide a higher primary to secondary ratio.

Figure 8:
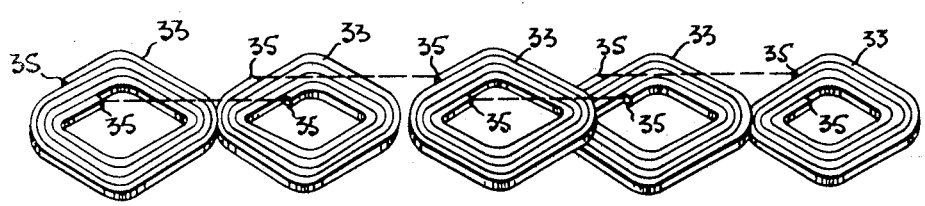
FIG. 8 is an exploded view showing the arrangement of individual coils of the transformer.
Figures 9, 10:
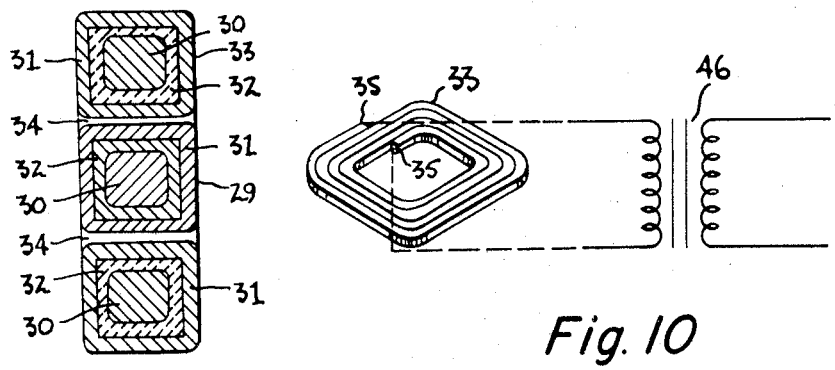
FIG. 9 is an enlarged fragmentary section of a portion of one of the coils.
FIG. 10 is a schematic representation of a method for applying bonding heat for the brazing of the transformer coils.

Each coil 33 is made by winding the coaxial conductor 29 upon itself in coplanar relationship, as illustrated in FIG. 8, until the requisite number of layers are obtained. During the winding operation, a thin strip of brazing alloy 34 in the form of ribbon or foil is held adjacent to the conductor 29 and is wound simultaneously therewith so as to be inter-leaved between adjacent layers of the coil, as shown in FIG. 9. At each end 35 of the coil 33, the outer conductor 31 and the adjacent insulation 32 are removed to expose a short length of the wire 30.

The layers of the coil 33 are now easily integrated by connecting the ends 35 of the conductor wire 30 in circuit with a power transformer 36 which passes a sufficient amount of electrical energy through the conductor 30 to elevate the temperature of the outer conductor to a value sufficient to melt the brazing alloy 34 and cause bonding of the adjacent layers of copper coil 33 to each other, as shown in FIG. 10. The use of the mineral insulation prevents any insulation breakdown at the temperature of 1400–1600° F. at which bonding occurs.

Each of the several coils 33 is wound and brazed in a substantially identical manner. The five coils 33 are then assembled to each other by placing each alternate coil 33 so that it is of opposite hand to the coil 33 immediately adjacent thereto. This arrangement maintains a uniform clockwise or counterclockwise (as the case may be) direction of current flow in all of the coils of the coil assembly 24. The inner exposed end 35 of one coil 33 is connected to the like inner end of one of the adjacent coils 33. The outer exposed end 35 is similarly connected to the like outer end of the other adjacent coil 33. When all five of the pancake coils 33 have been thus connected, they are brazed or otherwise intimately secured to each other, leaving a free inner end 35 and outer end 35 exposed respectively on the two outermost coils 33. These free ends 35 are adapted to be the terminal leads for connecting the primary coil of the coil assembly 24 electrically to the output of the alternator 21. To provide greater versatility for the transformer coil assembly, one or more auxiliary taps or leads 35a may be provided, preferably, but not necessarily, from the ends 35 of one or more coils 33 which are intermediate the outermost coils of the assembly 24. If, for example, each coil 33 has four layers and five coils 33 are used in the assembly, then the conductor wire 30 provides a primary transformer coil having four layers of five turns which terminates in the leads 35. If the leads 35 and 35a are used, then the effective primary coil consists of a lesser number of turns depending upon the location of the lead 35a.

Either prior to or after the assembly of the coils 33, but preferably prior thereto, each of the coils 33 has a small portion of the exterior conductor 31 removed therefrom as at 36 on each layer of the coil, thereby interrupting the physical continuity of the outer conductor at that point. The coils 33 are assembled with the gaps or areas 36 in substantial alignment and thus the outer conductor 31 of the entire coil assembly consists of a single-turn secondary coil having its terminal portions immediately adjacent to opposite sides of the gap 36. One of the welding electrodes 16 is mounted on the conductor 31 on each side of the gap 36. As heretofore indicated the welding electrodes are formed to provide fixtures or dies which are formed to receive elements of the article 10 which is to be welded. A pair of electrodes 16 may be enlarged or extended to operatively engage a plurality of weldpoints on the article 10, so that one transformer 15 may serve for two or more weldpoints if such weldpoints are sufficiently close to each other to make such an arrangement practicable.

A portion of the coil assembly 24, on the side opposite the electrodes 16, has a pair of support posts or plates 16a brazed or otherwise fixedly secured thereto. The posts 16a are, in effect, structural extensions of the electrodes 16 and provide, in combination with the coil assembly 24, a structure having sufficient strength and rigidity to be a self-contained article-supporting means during the welding operation. This utilization of the transformer as a structural work support means, makes it unnecessary to provide other structural work support elements for the electrodes, as is now the conventional practice. The posts 16a may be secured to a base plate 16b for convenience in mounting the transformer assembly on the platen 14.

The entire coil assembly is suitably encapsulated by a coating or layer of high temperature insulating material, such as epoxy resin over silicone tape, so that the transformer is protected and will not be harmed by flash, hot metal particles, etc., by reason of its location directly in the work area.

The power equipment

The power equipment may consist of any suitable of providing line power equipment adequate to satismeans for utilizing the available power supply and converting it, if necessary, to high frequency A.C. for the welding energy. However, I find it most desirable and advantageous to use rotating equipment, such as the alternator 21, for this purpose.

Figure 3:
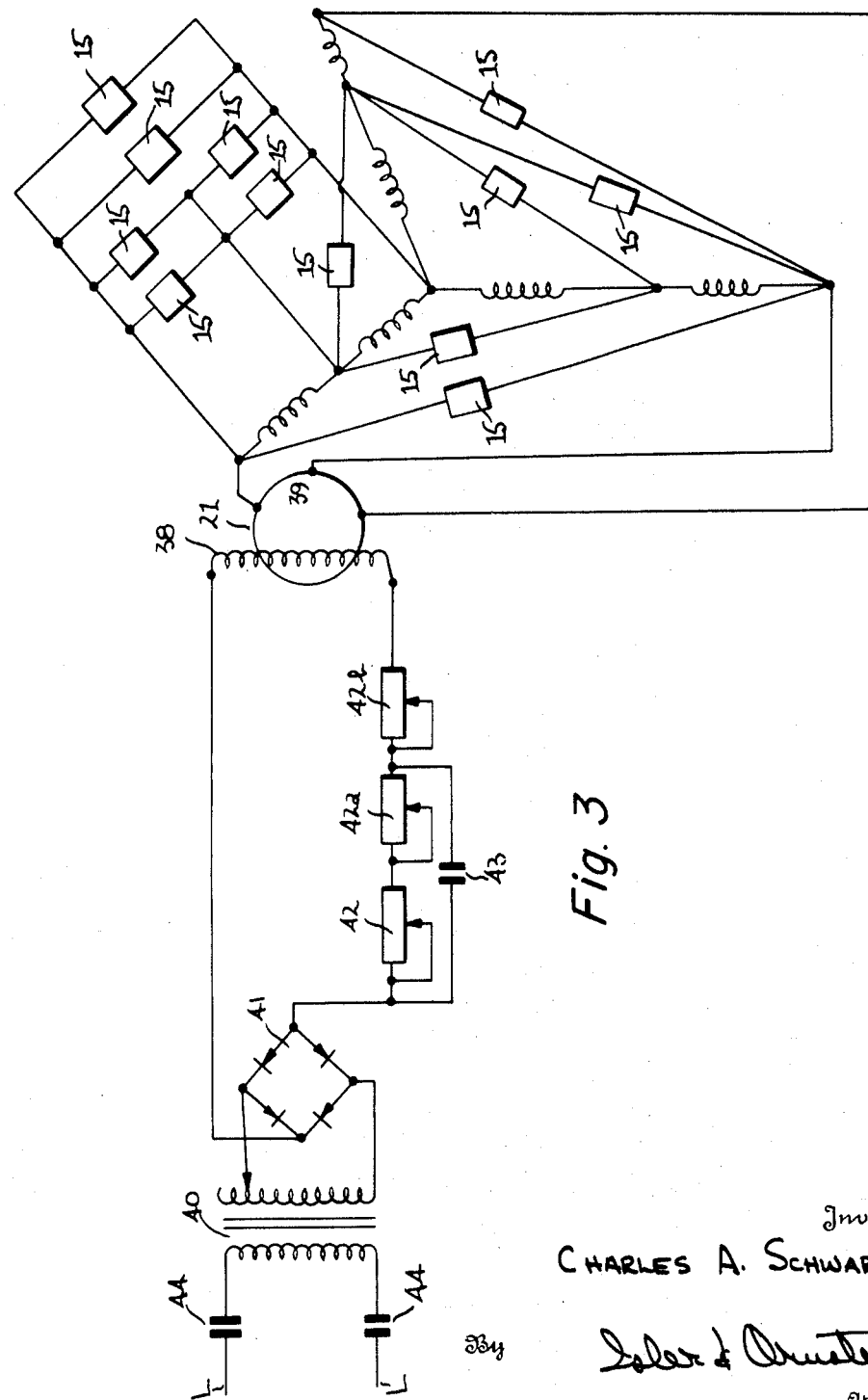
FIG. 3 is a circuit diagram of the power supply and control system for the welding transformers.

Referring to FIGS. 2 and 3, the alternator 21, which is coupled to the motor 22 provides the electrical power for the welding transformers. The problem of supplying sufficient power to the weldpoints is ordinarily an acute one in welding establishments. The momentarily large surges of electrical energy required during a resistance welding operation are of such magnitude that the cost factorily meet the maximum demand is prohibitive. In production welding establishments, where there are several units of electrical welding equipment, an effort is made to avoid any simultaneous operation of two or more welding units which would create an excessive demand upon the commercial power lines. However, such simultaneous operation nevertheless does occur frequently and results in unavoidable voltage drops which produce unsatisfactory welds. Such excessive power demands, also may adversely affect other electrical operaitions within the establishment or even in other establishments which are served by the same commercial power grid.

In addition to the aforementioned difficulty, commercial line voltages are otherwise subject to fluctuations from the nominal standard for which the welding equipment must be designed. These fluctuations, when of sufficient magnitude, are reflected in poor quality of welds.

The use of an alternator in combination with my control system and energy storing means, substantially eliminates the foregoing problems. To this end, the rotating masses of the alternator 21 and motor 22 are augmented by an inertia mass in the form of a flywheel 37 secured for rotation with the alternator. The flywheel serves as an energy storing means during the relatively long periods between the actual welding operations. Thus, for example, the time cycle in multi-spot welding for the alternator output may be ½ second "on" and 20 seconds "off." In consequence, neither the alternator 21 nor the motor 22 need be of a continuous duty size of rating equivalent to the high momentary power demand of the welding load, as the flywheel 37 stores motor energy for this purpose and thus stabilizes or levels off the demand on the motor. If for example, 800 kva. is required for the welding operation, an alternator having a 100% duty cycle rating of 150 kva. would serve adequately. The alternator may be single phase or three phase. Likewise, a motor, having an energy input of far less than 800 kva., will serve. For example, a 30 H.P. motor is of ample size to operate the alternator and meet the high demand of the intermittent-duty welding cycle. The transformers 15 are especially well adapted to utilize medium to high current frequencies; for example, in the range of 400 to 4000 c.p.s., although not necessarily limited thereto. The alternator 21 may, for purposes of illustration, be a 480 cycle unit.

*The control system*

I have provided a novel form of control for the welding system which eliminates the need for other types of costly control devices, such as ignitrons, and furthermore, is employed for the direct control of relatively small power values rather than for the much greater values which are actually involved in the welding circuit, thus further reducing the size and cost of the required control devices.

Basically, my concept relates to the indirect control of the power output of the alternator 21 by means of the direct control of the excitation current supplied to the rotating field 38 of the alternator 21. Referring to the circuit diagram of FIG. 3, I have used a three phase Y-connected alternator having each phase center-tapped to provide 173 v. phase to phase and 100 v. phase to neutral, and having a rotating field 38 and a stator winding 39 by means of which 480 cycle A.C. power is supplied to the primary coil 30 of each of the welding transformers 15. FIG. 3 indicates the great variety of power values which could be achieved by selection of combinations of alternator voltage, which can be further modified by selection of the appropriate tap leads 35–35a on the primary coil of each of the transformers.

D.C. power is supplied to the field windings 38 from a 440 v. 60 cycle power L—L through a step-down transformer 40, through a bridge rectifier 41 to produce for example 157 v. D.C. For effecting slope control of the welding current, it is sometimes desirable to provide a series of variable resistors such as 42, 42a and 42b, at least some of which can be shunted during the start of the welding cycle by means of a contactor 43 to provide field forcing for controlling the rate of welding power or energy rise build-up.

Contacts 44 are provided in the line L—L for on-off control of the D.C. power supply. In the system above described, in which 800 kva. might be required at the weldpoints, 20 kva. or less might be required for the D.C. field supply of the alternator 21, which is easier and far less expensive to control than the 800 kva. load.

It is also to be noted that at power values of the magnitude herein described, the inherent inductance of the alternator field provides a natural time delay in power build-up which in many instances is adequate for slope control without the use of additional circuit elements such as 42 and 43 for such control. In any case, the transformer saturation problems resulting from non-synchronous switching which are encountered in the use of a 60 cycle power supply and which require the use of elaborate circuitry, are eliminated.

Figure 4:
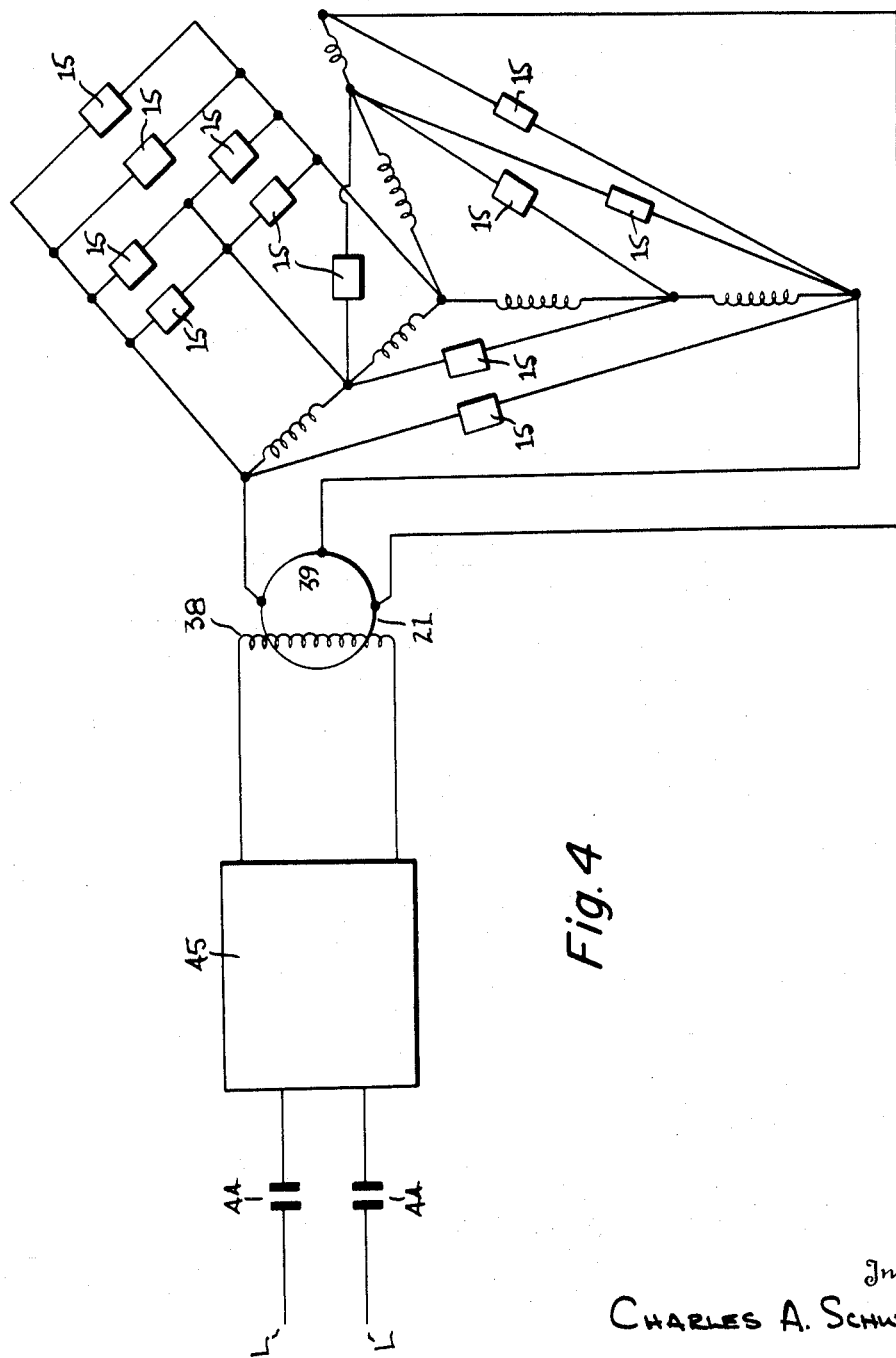
FIG. 4 is a circuit diagram similar to FIG. 3 showing a modified arrangement of the circuitry.

Any other suitable mechanism or source may be used for the D.C. excitation current. For example, as shown in FIG. 4, a more sophisticated circuit for finer control of the D.C. field current, could be provided by using an electronic phase shift rectifier unit 45 in lieu of the circuitry shown in FIG. 3 to supply the D.C. field current from the A.C. power line L—L. Such an arrangement could even be made to eliminate the minor effect of A.C. line voltage fluctuations on the D.C. field supply.

*The several advantages*

In connection with the foregoing disclosure, several points must be briefly emphasized.

By reason of the integration of the secondary coil of the welding transformer into a unitary single-turn conductive structure which intimately surrounds and completely embraces the primary coil, the conduction and dissipation of internally-generated heat is very rapid. The transformer 15 is thus capable of handling welding loads which would otherwise require much greater copper masses resulting in a larger size transformer.

The complete and intimate enclosure of the primary coil by the secondary coil also results in a very low degree of leakage reactance in the welding transformer. This characteristic permits the transformer to be successfully utilized at relatively high frequencies without the creation of excessive impedance values which would otherwise occur and make such use impracticable. The ability to employ high-frequency current permits a directly proportionate decrease in the necessary cross-sectional area of the core 25 which significantly reduces the bulk or mass of the transformer without any reduction in its ability to handle the welding load.

The method of manufacture of the transformer, using the novel coaxial rectangular conductor 29, permits a flexibility and ease of manufacture which makes such transformers relatively inexpensive and avoids the manifold problems which have heretofore been encountered in attempting to cast a unitary single-turn secondary coil.

Such casting process precludes the use of copper in the secondary coil and makes it necessary to use some other less conductive lower melting alloy of aluminum or the like, as the casting temperature of a copper secondary over a copper primary causes melting and distortion of the underlying primary coil.

The use of the coaxial conductor having a square outer cross-section and a firm filler of powdered mineral insulation additionaly provides the advantage of ease of bending, particularly sharp-corner bending so that a coil of rectangular shape can be readily formed to provide a greater volume of copper relatively to the core space available. Furthermore, the use of the packed insulation permits a relatively small clearance between the inner conductor and the outer conductor, thus resulting in a significantly high ratio of copper in the total cross-sectional area of the coaxial conductor 29.

The resulting compactness of the transformer, which is achieved by the foregoing, results in the further advantage of permitting the transformer and the welding electrodes to be integrated and disposed in direct association with the article to be welded, thus eliminating the significant power losses in the connecting cables between the electrodes and a remote welding transformer. Consequently both the electrical and physical dimensions of the transformer 15 are capable of further reduction without any loss of power at the weldpoint. The transformer thus not only is highly advantageous for multi-spot welding of the character described, but due to its relatively light weight is especially suitable for use in manually operated gun welders and similar portable devices.

The use of the alternator in combination with the energy storing flywheel permits the welding apparatus to be effectively independent and unaffected by the fluctuations or overload conditions which are involved when the commercial power lines are used directly for supply of the welding current. The described alternator arrangement is useful for heavy welding operations, even where relatively few weldpoints are involved, or in any type of welding operation where the problems of power line supply must be economically overcome.

The control system for the alternator permits welding currents of high magnitude to be controlled through the relatively low current values of the D.C. supply for the rotating field of the alternator. The control system also eliminates the need for auxiliary slope control devices, as the inductance of the field provides an inherent value of delay in energy rise which can be easily adjusted to desired values by circuit resistors and field forcing shunts when any such adjustment is required. The use of the Y-connected alternator in combination with the various taps on the welding transformer provides a flexibility and versatility of transformer performance which permits substantial uniformity of transformer design and structure in multi-spot welding operations while still allowing for selection of desired energy values at the various weldpoints.

It is to be understood that the forms of my invention, herewith shown and described, are to be taken as preferred examples of the same, and that various changes in the shape, size and arrangement of parts may be resorted to, without departing from the spirit of my invention, or the scope of the subjoined claims.

Having thus described my invention, I claim:

1. In an electrical power transformer for welding apparatus, a coil structure of substantially rectangular cross-section comprising a plurality of pancake coils in assembled relationship, each pancake coil consisting of a composite coaxial conductor of rectangular cross-section wound upon itself in a plurality of co-planar layers to form a multi-layer coil of substantially rectangular periphery, each of said pancake coils being disposed in coaxial alignment with an adjacent pancake coil, the inner conductors of each of said pancake coils being electrically connected in series with each other to provide a primary coil for said transformer, the outer conductors of each of said pancake coils being integrated with each other into a single electrical unit, and an aligned portion of each outer conductor in each layer of each pancake coil being removed to create a gap in the electrical continuity of said outer conductors to provide a single-turn secondary coil for said transformer.

2. A coil structure as defined in claim 1, wherein each of said pancake coils is coiled in opposite hand to its adjacent pancake coil.

3. A coil structure as defined in claim 1, wherein said composite coaxial conductor comprises a hollow outer conductor, an inner conductor disposed within said outer conductor, and granular insulating material filling the space between said inner and outer conductors and maintaining said conductors in spaced relationship to each other.

References Cited by the Examiner
UNITED STATES PATENTS

| | | | |
|---|---|---|---|
| 691,404 | 1/1902 | Meyers | 175—361 |
| 1,837,413 | 12/1931 | Dobson | 336—195 |
| 1,986,884 | 1/1935 | Fassler | 175—361 |
| 2,075,906 | 4/1937 | Maude | 336—195 X |
| 2,348,325 | 5/1944 | Brown | 336—195 X |
| 2,351,056 | 6/1944 | Lepetit | 174—118 X |
| 2,430,640 | 11/1947 | Johnson | 336—62 X |
| 2,453,241 | 11/1948 | Mann et al. | 336—195 |
| 2,556,602 | 6/1951 | Schwartz | 175—356 |
| 2,800,612 | 7/1957 | Riley | 336—62 X |
| 2,911,605 | 11/1959 | Wales | 336—208 X |
| 2,929,915 | 3/1960 | Taylor et al. | 219—89 |
| 3,047,935 | 8/1962 | Reichelt | 29—155.57 |
| 3,112,556 | 12/1963 | Zack | 29—155.57 |

JOHN F. BURNS, *Primary Examiner.*

RICHARD M. WOOD, LARAMIE A. ASKIN,
*Examiners.*